(12) United States Patent
Nikolov et al.

(10) Patent No.: US 11,675,107 B2
(45) Date of Patent: Jun. 13, 2023

(54) SEE-THROUGH REFLECTIVE METASURFACE

(71) Applicant: University of Rochester, Rochester, NY (US)

(72) Inventors: Daniel Nikolov, Rochester, NY (US); Jannick P. Rolland-Thompson, Seneca Falls, NY (US); Nick Vamivakas, Rochester, NY (US); Fei Cheng, Granger, IN (US); Aaron Bauer, Penfield, NY (US)

(73) Assignee: University of Rochester, Rochester, NY (US)

( * ) Notice: Subject to any disclaimer, the term of this patent is extended or adjusted under 35 U.S.C. 154(b) by 158 days.

(21) Appl. No.: 17/018,284

(22) Filed: Sep. 11, 2020

(65) Prior Publication Data

US 2021/0103072 A1    Apr. 8, 2021

Related U.S. Application Data

(60) Provisional application No. 62/899,522, filed on Sep. 12, 2019.

(51) Int. Cl.
*G02B 1/00*  (2006.01)
*G02B 27/01* (2006.01)

(52) U.S. Cl.
CPC ......... *G02B 1/002* (2013.01); *G02B 27/0172* (2013.01); *G02B 2027/013* (2013.01)

(58) Field of Classification Search
CPC ............... G02B 1/002; G02B 27/0172; G02B 2027/013

(Continued)

(56) References Cited

U.S. PATENT DOCUMENTS 8,921,789 B2 * 12/2014 Pryce .................. B32B 15/04
                                                    250/338.1
10,371,951 B2 *  8/2019 Rolland ............ G02B 27/0172
(Continued)

FOREIGN PATENT DOCUMENTS

WO       2016161175 A1    10/2016

OTHER PUBLICATIONS

Axelevitch et al. (2012) "Investigation of Optical Transmission in Thin Metal Films," Phys. Procedia. 32: 1-13.
(Continued)

*Primary Examiner* — Collin X Beatty
*Assistant Examiner* — Grant A Gagnon
(74) *Attorney, Agent, or Firm* — Andrew J. Anderson, Esq.; Harter Secrest & Emery LLP

(57) ABSTRACT

A see-through reflective optical device includes: a reflective metasurface configured for a targeted design optical wavelength, wherein the reflective metasurface comprises a sub-wavelength periodic arrangement of meta-atoms formed by patterned isolated gap surface plasmon (GSP) resonators, where the patterned isolated GSP resonators comprise a patterned optically thin metal layer for the design wavelength, an optically thick metal layer for the design wavelength, and an insulator layer between the patterned optically thin metal layer and the optically thick metal layer; and an array of apertures of random positions and diameters greater than the targeted design wavelength formed through the reflective metasurface providing a designed percentage of light transparency through the reflective metasurface. The reflective metasurface of the see-through reflective optical device may comprise, e.g., a reflective diffraction grating metasurface, and may be used as a combiner element surface in a near eye display assembly.

20 Claims, 6 Drawing Sheets

(58) Field of Classification Search
USPC .......................................................... 359/630
See application file for complete search history.

(56) References Cited

U.S. PATENT DOCUMENTS

| | | | | |
|---|---|---|---|---|
| 2011/0111545 | A1* | 5/2011 | El-Gamal | B81C 1/00587 |
| | | | | 257/E21.002 |
| 2012/0327502 | A1* | 12/2012 | Zheludev | G02B 1/007 |
| | | | | 374/161 |
| 2013/0021392 | A1 | 1/2013 | Travis | |
| 2013/0329301 | A1 | 12/2013 | Travis | |
| 2016/0161175 | A1* | 6/2016 | Benold | F25D 11/00 |
| | | | | 312/405 |
| 2016/0299270 | A1* | 10/2016 | Kotov | G02B 5/1861 |
| 2016/0370568 | A1* | 12/2016 | Toussaint | C03C 17/36 |
| 2017/0242163 | A1* | 8/2017 | Aksyuk, IV | G02B 1/002 |
| 2018/0292644 | A1* | 10/2018 | Kamali | G02B 26/0875 |
| 2019/0296521 | A1* | 9/2019 | Yun | H01S 5/1025 |
| 2019/0369401 | A1 | 12/2019 | Rolland et al. | |
| 2020/0303828 | A1* | 9/2020 | Urzhumov | H04B 7/0456 |
| 2021/0063683 | A1 | 3/2021 | Nikolov et al. | |

OTHER PUBLICATIONS

Bauer et al. (2014) "Visual space assessment of two all-reflective, freeform, optical see-through headworn displays," Opt. Express 22(11): 13155-13163.

Bergsten et al. (1977) "White-light Fresnel diffraction by a circular aperture," J. Opt. Soc. Am. 67(5): 643-647.

Burch (1985) "Fresnel diffraction by a circular aperture," American Journal of Physics 53, 255-260.

Chen et al. (2012) "Dual-polarity plasmonic metalens for visible light," Nat. Commun. 3(1198): 1-6.

Cheng et al. (2015) "Enhanced structural color generation in aluminum metamaterials coated with a thin polymer layer," Opt. Express 23(19): 25329-2533.

Cheng et al. (2015) "Structural color printing based on plasmonic metasurfaces of perfect light absorption," Scientific Reports 5, 11045.

Cheng et al. (2018) "Polarization-switchable holograms based on efficient, broadband multifunctional metasurfaces in the visible regime," Opt. Express 26(23): 30678-30688.

Coan et al. (2013) "Preparation of PMMA/hBN composite coatings for metal surface protection," Mat. Res. 16(6): 1366-1372.

Kitt et al. (2015) "Visible metasurfaces and ruled diffraction gratings: a comparison," Opt. Mat. Express 5(12): 2895-2901.

Lee et al. (1967) "Fresnel diffraction patterns of an array of circular apertures," J. Opt. Soc. Am. 57(9): 1115-1120.

Levola et al. (2007) "Replicated slanted gratings with a high refractive index material for in and outcoupling of light," Opt. Express 15(5): 2067-2074.

Li et al. (2015) "Visible-frequency metasurfaces for broadband anomalous reflection and high-efficiency spectrum splitting," Nano Lett. 15:1615-1621.

Link (1999) "Electron dynamics in gold and gold-silver alloy nanoparticles: the influence of a nonequilibrium electron distribution and the size dependence of the electron-phonon relaxation," J. Chem. Phys. 111(3): 1255-1264.

Liu et al. (2017) "Design of a uniform-illumination binocular waveguide display with diffraction gratings and freeform optics," Opt. Express 25(24): 30720-30731.

Nikolov et al. (2018) "Long-term efficiency preservation for gradient phase metasurface diffraction gratings in the visible," Opt. Mater. Express 8(8): 2125-2130.

Nikolov et al. (2019) "See-through reflective metasurface diffraction grating," 9(10): 4070-4080.

Pors et al. (2013) "Efficient and broadband quarter-wave plates by gap-plasmon resonators," Opt. Express 21(3): 2942-2952.

Pors et al. (2013) "Gap plasmon-based metasurfaces for total control of reflected light," Sci. Rep. 3(2155): 1-6.

Pors et al. (2013) "Plasmonic metasurfaces for efficient phase control in reflection," Opt. Express 21(22): 27438-27451.

Sun et al. (2012) "High-efficiency broadband anomalous reflection by gradient meta-surfaces," Nano Lett. 12(12): 6223-6229.

* cited by examiner

Device　　　　　Device Front　　　　Device Back

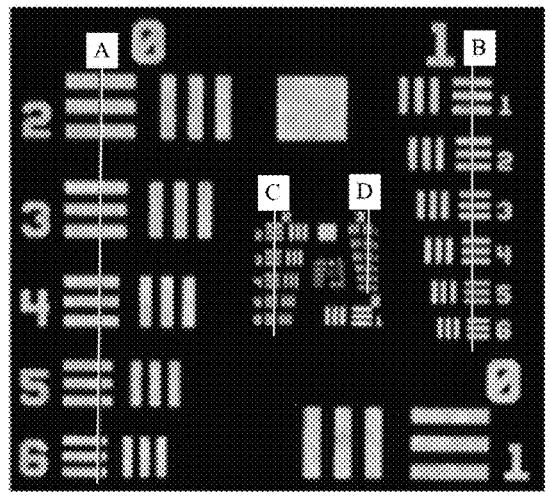 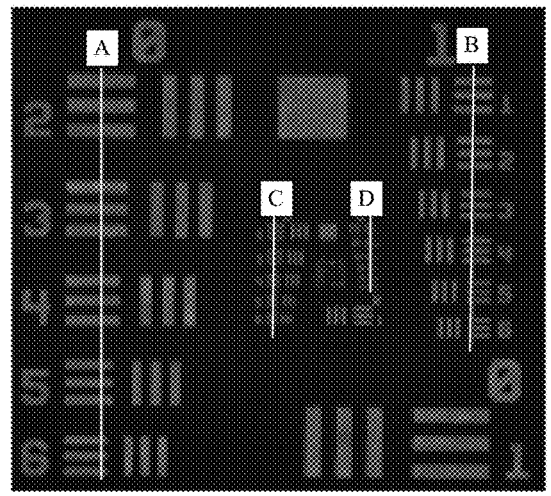
FIG. 4A          FIG. 4B
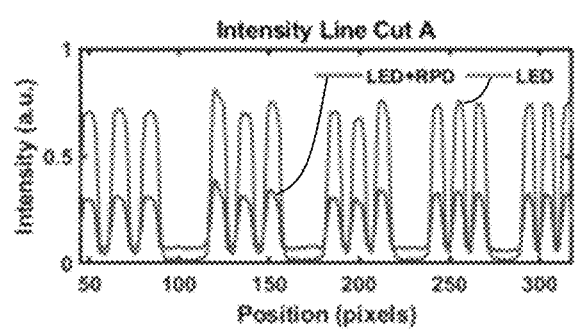 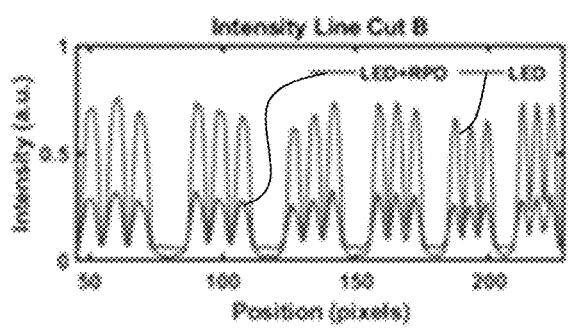
FIG. 4C          FIG. 4D
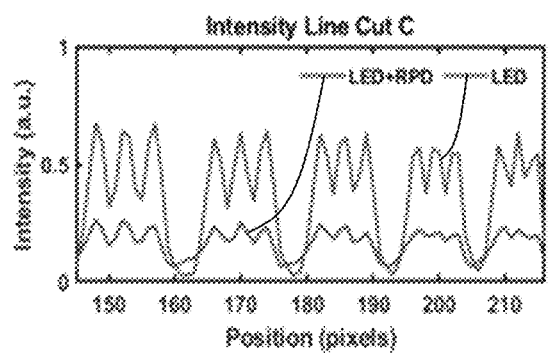 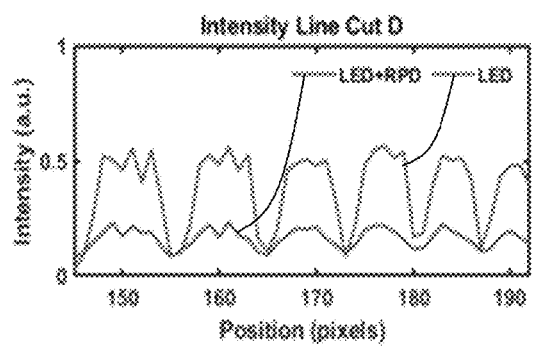
FIG. 4E          FIG. 4F

SEE-THROUGH REFLECTIVE METASURFACE

REFERENCE TO RELATED APPLICATIONS

This application claims the benefit of U.S. Provisional Application No. 62/899,522 filed Sep. 12, 2019, the disclosure of which is incorporated by reference herein in its entirety.

BACKGROUND

Optical elements such as diffractive gratings have a variety of applications in emerging optical domains such as the design of head-worn displays (HWDs) (see references 1-4). Gratings used in HWDs must be robust enough for a consumer device, operate in reflection in the visible regime to relay a virtual image to the eye as a part of a waveguide relay (see references 5-9 cited below) or serve as a reflective combiner (see references 10, 11 cited below). The combiner is an optical apparatus that combines two images together, from either the same side of the combiner (reflective/reflective, or transmissive/transmissive) or from the two different sides of the combiner (reflective/transmissive). In the later function, it must also be see-through in transmission, so the combiner does not obscure the real world, as shown in FIG. 1A. The image information conveyed by the combiner can have an angularly encoded form for projecting virtual images into the eyes of the viewer.

Generally, there are two versions of combiners. The first version combines two fields without adding any lensing to either field (such as a tilted dichroic plate). The second version includes a lensing functionality, in addition to the combining functionality, which can be an all-spherical, off-axis conic, aspheric, or freeform lensing for the field coming from the display. The lensing functionality is used to displace the virtual image originating from the display into the far field or at a specific distance from the combiner and to give the image a certain field of view to enable the user to bring the virtual image into focus at the target size. The lensing functionality is configured to provide adequate correction of the optical aberrations throughout the field of view being displayed. The lensing functionality may also be configured to provide ophthalmic correction for individual users.

Recently it has been shown that metasurface devices can be used to replace traditional optical elements such as lenses (see reference 12 cited below), polarizers (see references 13, 14 cited below) and holograms (see reference 15 cited below). Such optical metasurfaces are composed of rationally designed nanostructures (called e.g., artificial atoms, meta-atoms, meta-tokens, nanoantenna, etc.), which are proposed to replace some conventional optical elements given their compact size and more importantly, the ability to produce spatially varying phase change (i.e. wavefront reshaping), amplitude modulation and polarization conversion of incident light over subwavelength dimensions. In particular, successful implementation of reflective diffraction gratings using metal-dielectric-metal metasurfaces has been demonstrated in the infrared (see references 16, 17 cited below) and the visible (see references 18, 19 cited below). Organic polymers such as polymethyl methacrylate (PMMA) have been used to increase the robustness of these structures for consumer devices use by preventing metal degradation (see references 20-24 cited below).

A key component of reflective diffraction gratings using metal-dielectric-metal metasurfaces is an optically thick metal backplate (with the thickness on the scale of tens to hundredths of nm) that allows the phase of the reflected wavefront to be tuned between $-\pi$ and $\pi$. A metasurface device comprising an opaque non-transparent metal backplate cannot be used in an HWD waveguide relay or combiner, however, as it will obscure the user's view of the real world. Accordingly, it has been proposed in WO2016/161175 to provide a reflective diffraction grating in the form of a metasurface (i.e., a "meta-grating") with perforations with an aperture pattern and sizing that allows the transmission of light through the meta-grating, where the perforations are sufficient to render the device substantially transparent to the viewer. Providing a patterned array of apertures in a substrate, however, can itself generate various undesirable diffraction artifacts in the transmitted light (see references 28-30 cited below).

Previous work has also shown that noble metal films can be semi-transparent for visible light illuminating films with critical thickness (e.g., 2-6 nm for Ag films in particular) (see reference 25 cited below), where in this regime the metal transitions from continuous to islands film. The anomalous transmission in such films is due to localized plasmons whose intensity and frequency are determined by the dimensions of the islands (see references 26, 27 cited below). Modeling of such an ultrathin, quasi-continuous film deposition and the effect of these localized plasmons on the anomalous reflection of metal-dielectric-metal metasurface devices (assuming the use of metal films with critical thickness as a backplate), however, together with the fabrication of these films would be quite challenging.

A variety of optical systems and component designs have been proposed for augmented reality head mounted displays. It would be desirable to provide further improved reflective metasurface designs, and in particular embodiments of reflective metasurface diffractive gratings, for use in such head mounted displays, as well as for use in other optical systems.

SUMMARY

In accordance with an embodiment of the disclosure, a see-through reflective optical device is described, comprising: a reflective metasurface configured for a targeted design optical wavelength, wherein the reflective metasurface comprises a sub-wavelength periodic arrangement of meta-atoms formed by patterned isolated gap surface plasmon (GSP) resonators, where the patterned isolated GSP resonators comprise a patterned optically thin metal layer for the design wavelength, an optically thick metal layer for the design wavelength, and an insulator layer between the patterned optically thin metal layer and the optically thick metal layer; and an array of apertures of random positions and diameters greater than the targeted design wavelength formed through the reflective metasurface providing a designed percentage of light transparency through the reflective metasurface. In accordance with particular disclosed embodiments, the reflective metasurface of the see-through reflective optical device may comprise, e.g., a reflective diffraction grating metasurface.

In accordance with a further embodiment of the disclosure, a near eye display assembly is described, comprising: (a) frame; (b) a combiner operably connected to the frame as a first reflective surface positionable in front of an eye of a user of the display assembly; (c) a secondary mirror operably connected to the frame as a second reflective surface positionable proximate a side of the nose adjacent to the eye of a user of the display assembly; (d) an image source operably connected to the frame and optically coupled to the secondary mirror along an optical path; and (e) an optical fold element between the image source and the secondary mirror in the optical path, and positionable proximate the temple adjacent to the eye of a user of the display assembly; wherein the combiner and the secondary are in a folded geometry which directs images from the optical fold element to an eyebox of the near eye display assembly, and wherein the combiner comprises a see-through reflective optical device as described, which provides wavefront control of a reflected image from the image source which combines the reflected image with an image transmitted through the combiner.

BRIEF DESCRIPTION OF THE DRAWINGS

FIG. 4A illustrates the intensity of an image of a negative 1951 USAF test target illuminated by a low coherence LED without the RPD pattern sample.

FIG. 4B illustrates the intensity of an image of the target illuminated by the LED through the RPD pattern sample.

FIGS. 4C-4F illustrate the intensity measured through line cuts A-D shown in FIGS. 4A and 4B. The intensity is measured in arbitrary units such that 1 corresponds to a fully saturated pixel on the camera detector and 0 corresponds to a fully dark pixel.

DETAILED DESCRIPTION

Figures 1A, 1B, 1C:
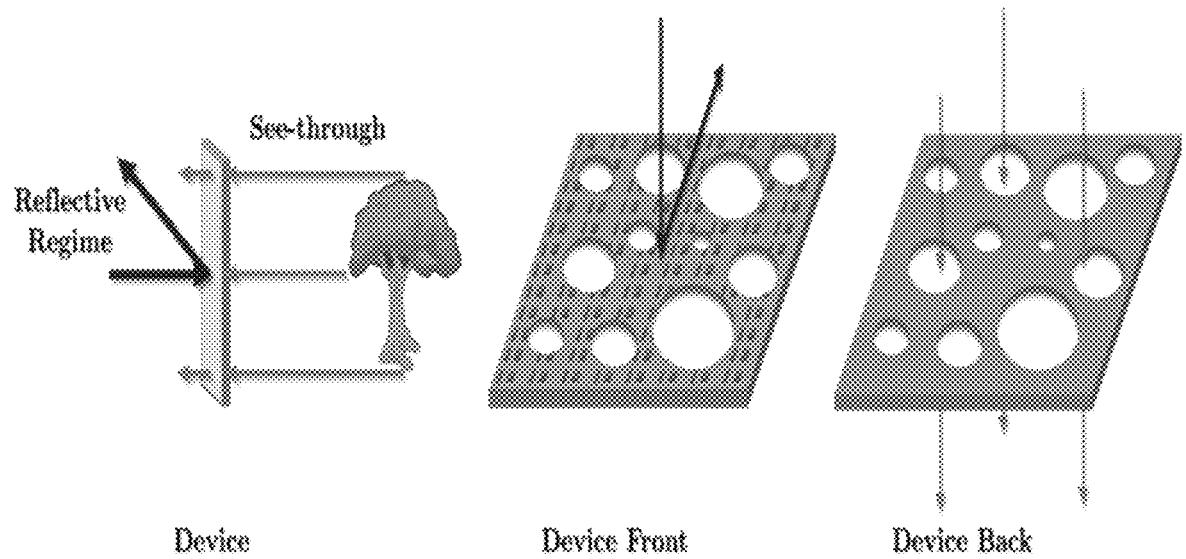
FIG. 1A illustrates the two working regimes of a device application in accordance with one embodiment of the disclosure—reflective and see-through. The reflective side provides arbitrary optical function. Light illuminating the device from the back side gets transmitted through with minimal alterations.
FIG. 1B illustrates the reflective side of a device in accordance with one embodiment of the disclosure. The rectangular nano-tokens shape the reflected wavefront.
FIG. 1C illustrates the back side of a device in accordance with one embodiment of the disclosure. The large circular apertures provide the see-through property. The device image was reversed to match the orientation in FIG. 1B for easier comparison.

A metal-dielectric metasurface device that behaves as a grating in reflection and is see-through in transmission is described and demonstrated. More particularly, the present disclosure describes an effective way to achieve semi-transparency while preserving the anomalous reflection achieved with a metal-dielectric metasurface. A set of preferably circular apertures with diameters larger than the wavelength of operation (e.g., at least 2 times the wavelength) are etched through the optically thick metal backplate of such a metasurface device, wherein an array of apertures of random position and diameter (RPD) is created on the device to provide a desired transmission ratio while avoiding undesirable diffraction artifacts. The advantage of this described method and device is that a see-through function of the device can be achieved with a continuous metal backplate with thickness (tens to hundreds of nm) much higher than the critical thickness. These apertures are large enough (e.g., tens of microns diameters for a targeted design optical wavelength in the visible spectrum) that they will not interfere with the grating function in reflection, while also being small enough that they will be invisible to the human eye. Furthermore, by increasing the total area covered by the apertures as desired, an arbitrary high see-through ratio (e.g., 10-90%) can be achieved for all visible light.

We define a reflective metasurface of an optical device as a reflective optical surface whose optical function can be custom-tailored by designing the local geometry of sub-wavelength (relative to a targeted design optical wavelength for the device) nanostructures patterned on the device. When the device is illuminated with a source of chosen wavelength band, the light interacts with the nanostructures and the reflected wavefront can be arbitrarily defined and controlled the based on selected subwavelength features.

In various embodiments, e.g., a reflective metasurface of an optical device may have, e.g., an optical function of a diffraction grating, or may have an optical function of an optically powered mirror, or may have an optical function of an optical aberration generating reflective surface with a general phase (i.e., defined by a combination of basis functions (e.g. radial basis functions, NURBs, X-Y polynomials, Zernike polynomials, Q-polynomials, Chebyshev polynomials, other non-orthogonal or orthogonal polynomials over complex aperture shapes)). In such structures, the complex reflection coefficient $r=|r|e^{i\angle r}$ of the element unit may be evaluated numerically, e.g., by running a parametric sweep of the lateral dimensions of the metal-dielectric-metal stack. The unit elements chosen from the parameter space are then arranged periodically with a fixed unit cell pitch.

In a particular embodiment, a reflective diffraction grating in the form of a metasurface (i.e., a "meta-grating") may be formed of a periodic arrangement of a plurality of unit cells, wherein each unit cell includes a plurality of sub-wavelength dimensioned meta-atoms. The sizing and spacing of the meta-atoms determine the operating characteristics of the meta-grating. Meta-grating unit cells may be configured, e.g., as described in WO2016/161175. In one aspect, the unit cell includes three layers—a base optically thick metal layer, a dielectric layer and an optically thin meta-atom layer. The dielectric layer is supported by the base layer and the meta-atom layer is supported by the dielectric layer.

The number of meta-atoms or tokens within a unit cell determines the number of steps in the stepwise linear phase response. For instance, for a period with three tokens there are three steps in the phase response across a single unit cell with the distances between the steps being $2\pi/3$. The main degrees-of-freedom to achieve the desired stepwise linear phase response in a metagrating are the x and y dimensions of each token within the unit cell as well as the thicknesses of the metal and dielectric layers.

The disclosed metasurface reflective diffraction grating elements more particularly employ isolated gap surface plasmon (GSP) resonators as the constituent element, which features a high reflective localized plasmonic resonance (see reference 32 cited below). Such GSP resonators typically comprise a subwavelength dimensioned (for the design wavelength of the optical element) patterned optically thin metal layer over an insulator layer and a continuous optically thick metallic ground plane layer.

An optically thin metal layer is a metal layer that is thinner than the skin depth of the material for radiation of a design wavelength. For silver metal layers, e.g., thickness of less than 40 nm (thinner than the skin depth of the metal) are optically thin for visible light at wavelengths from 400-750 nm, while thicker layers (thicker than the skin depth of the metal) are effectively reflective. The optically thin top metal layer of the stack, while optically thin for the design wavelength, is preferably at least 30 nm for robustness. The base layer is minimally optically thick for the design wavelength, but is preferably less than 130 nm for ease in fabrication or to optimize efficiency. In addition to silver, Au, Al and other metals with high reflectivity in the visible may also be used for the metal layers, wherein appropriate thicknesses for such other metal layers may be employed to provide optically thin and optically thick metal layers for a targeted design optical wavelength.

The insulator layer may be any materials conventionally used in forming gap surface plasmon (GSP) resonators, e.g., such as $SiO_2$ at conventional thicknesses (e.g., from 40-80 nm). Other insulator materials that may be used include, e.g., $TiO_2$, $Si_3N_4$, $MgF_2$, $CaF_2$, $Al_2O_3$, and other visible transparent, non-absorption dielectric materials at appropriate thicknesses.

Simulations and Modeling

Diffractive gratings in accordance with the present disclosure may be designed to provide an effective line density, up to for example 2000 lp/mm, for a range of illumination wavelengths, preferably but not exclusively in the visible range from 400 to 750 nm, for reflection and percent transmission (e.g., 10-90%, preferably 20-80%, for visible light transmission). Such diffractive gratings may be designed to provide a desired diffraction efficiency over a range of angles of incidence to meet various usage needs.

For one described representative embodiment, a goal is to design and fabricate a device that functions as a 1200 lp/mm diffractive grating in reflection with a 650 nm illumination wavelength and transmits 50% of all visible light that illuminates the device from the back. The diffraction efficiency in the first diffractive order in reflection is ~20% and preferably is uniform (or at least does not drastically vary) for angles of incidence (AOI) $\theta_i$ ranging from 0 to 50 degrees. An example of back illumination in a consumer device may be the bright white light of approaching vehicles while driving. The see-through regime combined with the flat diffractive efficiency in reflection will allow such device to be used in a variety of optical systems with wide field-of-view (FOV) including but not limited to HWDs.

Figure 2A:
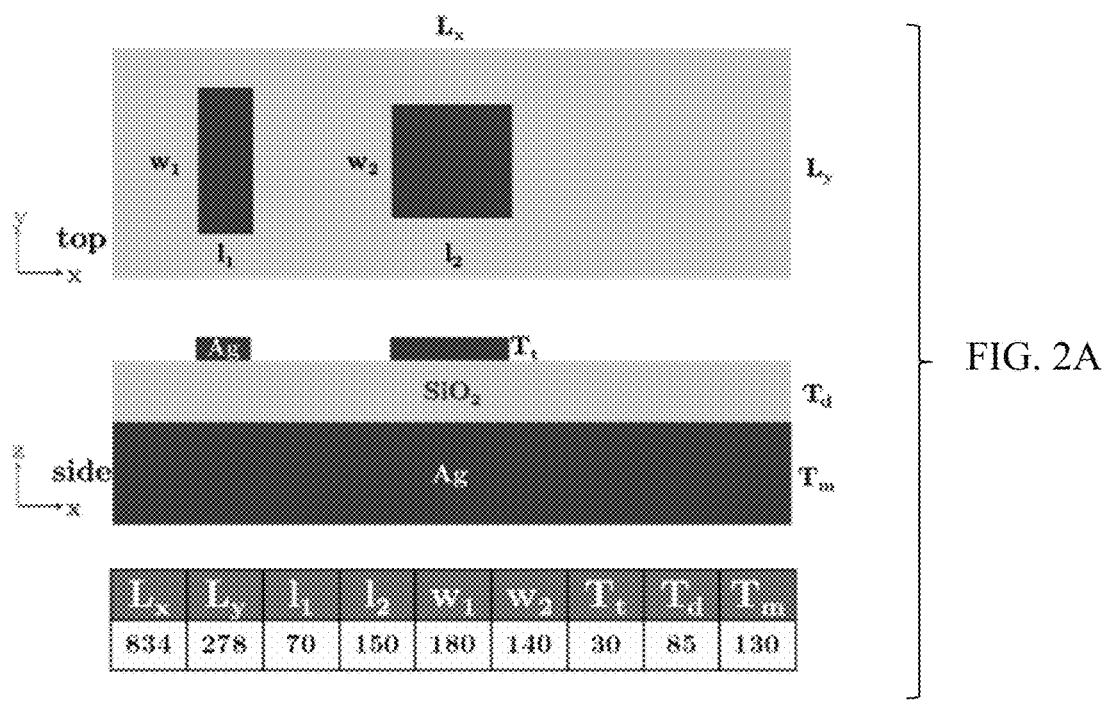
FIG. 2A illustrates the unit cell for the final designed metasurface in accordance with one embodiment of the disclosure—top x-y and side x-z view (diagram) including dimensions in nm (table).

To achieve a $-\pi$ to $\pi$ linear phase response in reflection, we pattern the front of the device with Ag nano-tokens of varying dimensions like in our previous work on metal-dielectric-metal gratings (see reference 24 cited below). The linear phase response is simulated stepwise by a sequence of rectangular nano-tokens within a single unit cell (one period) each of which has its own amplitude and phase response. Unit cells of dimensions $L_x=834$ nm by $L_y=278$ nm are chosen to meet the 1200 lp/mm specification for the grating as shown in FIG. 2A. $SiO_2$ is used for the dielectric insulator and Ag is chosen for the metal backplate. The thicknesses of each layer are listed in the table in FIG. 2A. PMMA may be used as a further coating material in order to protect the sample from oxidation and contamination.

Figure 2B:
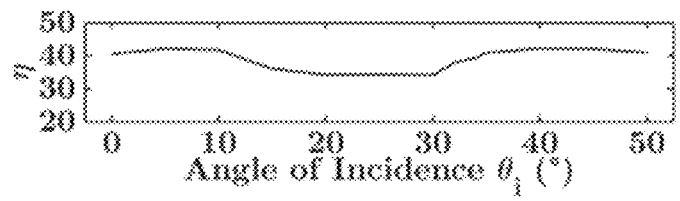
FIG. 2B illustrates the modeled efficiency of the first diffractive order for AOIs from 0 to 50°.

The number of tokens within the unit cell determines the number of steps in the stepwise linear phase response. For instance, for a period with three tokens there are three steps in the phase response across a single unit cell with the distances between the steps being $2\pi/3$. Splitting each unit cell in three square regions (one for each token) we get Ly=278 nm (one third of Lx=834 nm) as shown in FIG. 2A. The main degrees-of-freedom to achieve the desired stepwise linear phase response are the x and y dimensions of each token within the unit cell as well as the thicknesses of the metal and dielectric layers. A commercial finite-difference-time-domain software (Lumerical Solutions, Inc.) was used to perform a parameter sweep calculating the individual amplitude and phase response of tokens with varying x and y dimensions and normal AOI illumination. A token with specific width and height is chosen for each square to approximate the linear grating response as a step-wise function based on the parameter sweep results (see reference 19 cited below). During the design process, we established that the third token had the smallest dimension and could be removed without significantly affecting the overall efficiency and phase gradient of the grating. This decreased complexity of the design allows for an easier fabrication process (the "empty region" still serves its purpose as part of the linear phase ramp giving a relative phase response of zero). The dimensions of the final set of tokens are listed in FIG. 2A. The full unit cell was modeled using anti-symmetric boundary conditions along the y-axis, Bloch boundary conditions along the x-axis, and a perfectly matched layer (PML) boundary conditions along the z-axis. A parameter sweep varying the AOI of the incoming illumination was completed evaluating the diffraction efficiency of the first diffractive order using a frequency-domain field monitor for each AOI. The resulting nominal efficiency as a function of AOI is presented in FIG. 2B. It should be noted that the optimized efficiency over a broad range of AOIs is 40% for the grating shown in FIG. 2A, which is twice that of the of the final device accounting for the 50% see-through transmission (as further described herein).

It should be noted that there are various sets of three tokens that can provide a linear phase across the structure with a high efficiency for normal AOI. However, it is challenging to achieve a high efficiency for a large range of AOIs. In our workflow we first chose a set of three tokens approximating a linear phase based on the parameter sweep of a single token at normal AOI. We then modeled the complete unit cell using those three tokens for various AOIs. If the efficiency response as a function of AOI was not sufficiently flat, we chose another set of three tokens and reiterated the process until the final design was achieved.

RPD Aperture Design

To provide a desired design transmissivity (e.g., 10-90%, more preferably 40-60% to simultaneously balance both desired high reflective diffraction efficiency and transparency) without creating undesirable diffraction artifacts, the meta-grating device is perforated with an array of apertures of random position and diameter (RPD) that allows a desired fraction of transmission of light through the meta-grating, where the perforations are sufficient to render the device substantially transparent to the viewer. Specifically, a set of circular apertures with diameters much larger than the wavelength of operation (e.g., at least two times the wavelength of operation) are etched through the optically thick metal backplate of the metasurface device to provide a desired transmission ratio. These apertures are large enough that they will not interfere with the grating function in reflection, while also being small enough in relation to the anticipated distance between the device surface and an observer's eye (e.g., preferably with a maximum radius in the range of 18 to 30 micrometers for a corresponding range of eye relief of from 15 to 25 mm, which may be typically present for a near eye display device combiner optical element) that they will be practically invisible to the human eye. Furthermore, by increasing the total area covered by the apertures as desired, an arbitrary high see-through ratio can be achieved for all visible light. The advantage of this described method and device is that a see-through function of the reflective diffraction grating metasurface device can be achieved with a continuous metal backplate with thickness (tens to hundreds of nm) much higher than the critical thickness.

To create the RPD aperture pattern, a MATLAB script was developed that generates the fabrication files used in the optical lithography process. Initial modeling and testing showed that using apertures of a fixed size or position creates unwanted diffraction artifacts of the transmitted light. These artifacts included lines, colored rings and other artifacts with well-defined structure. These artifacts were eliminated by randomizing the position and diameter of the apertures. The resulting performance is discussed in more details in the following section.

First, we consider the numerical generation of the RPD aperture patterns. The optical lithography files required to etch the apertures take as input the position and diameter of the circular apertures. It is required for the apertures to not overlap and for the fraction of the overall area covered by the RPD aperture pattern to be equal to the target transmission ratio specification (50% in the current work). The complete RPD aperture pattern is generated iteratively. A random position within the sample dimensions (834 µm by 834 µm) is chosen followed by a random radius varying between 8 µm and 30 µm. This range of aperture radii was chosen such that the apertures are large enough to be easily pattern transferred using optical lithography and etching while also being small enough not to be seen by the naked eye. In further embodiments, aperture diameters may be varied over a wider range if desired, e.g., from 2 to 100 micrometers or more, depending upon manufacturing techniques used and anticipated eye relief distances from the manufactured device in use as discussed above. If the aperture is fully within the sample, its area, position and radius are recorded. A second aperture is then selected. If it intersects with the first aperture, it is dropped, and another random aperture is generated. If it does not intersect with any existing aperture, its area, position and radius are stored. This process is repeated until the sum of the area of all stored apertures covers the area matching the required transmission ratio.

Figure 2C:
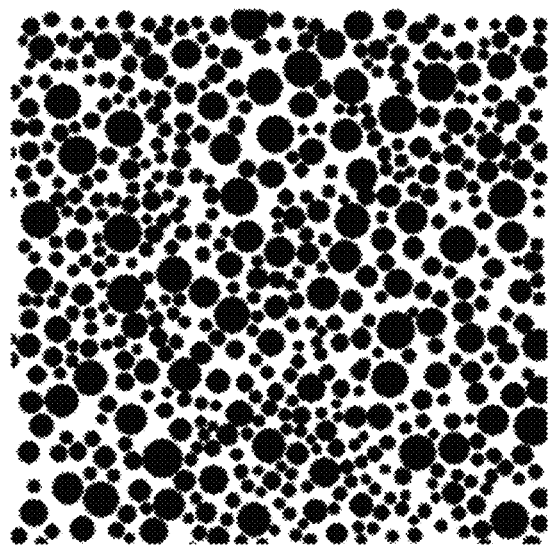
FIG. 2C illustrates a random position and diameter of the pattern of apertures that is superimposed on the metasurface design shown in FIG. 2A to enable the see-through regime. The aperture sizes vary, e.g., between 8 µm and 30 µm radius.

The described procedure can be computationally heavy for large samples. To avoid unreasonably long file generation times, we segment the full sample in smaller regions and generate the RPD aperture pattern for each region individually to satisfy the required transmission ratio. To avoid having continuous streaks between regions that can cause diffraction artifacts we allow the apertures from each region to overflow into the neighboring region. The pattern shown in FIG. 2C is generated by segmenting the complete 834 µm by 834 µm in a 3×3 grid of 278 µm by 278 µm regions. It should be noted that with the described method it is possible that two apertures at the vertex between two diagonal regions can overlap. However, such occurrences are small enough compared to the full pattern size that this effect is negligible.

Fabrication

The device fabrication process is completed in two main stages.

Figure 3A:
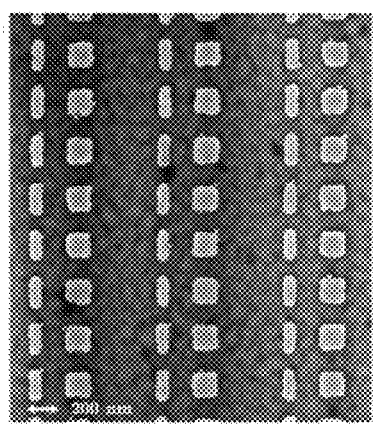
FIG. 3A illustrates an SEM image of the nano-tokens forming the grating on the front of a device in accordance with an embodiment of the present disclosure. The scale is 200 nm.

In the first stage, the metasurface grating design from FIG. 2A is fabricated on a quartz substrate. A standard e-beam lithography (EBL) process was used to fabricate the metasurface grating. First, a 130 nm-thick Ag film was deposited on a 4-inch Si wafer using e-beam evaporation (PVD-75 Lesker, base pressure is $\sim 1\times 10^{-6}$), followed by an 80 nm of $SiO_2$ and a 30 nm of Ag film on top. Secondly, a bi-layer positive resist (495 A2 and 950 M2) was spin coated on the substrate and then exposed to the pattern designed using an EBL (JEOL9500) tool with an acceleration voltage 100 kV and area dose of 1000 µC/cm². After EBL, the bi-layer resist was developed for 45 seconds in a mixture of isopropanol (IPA):methyl isobutyl ketone (MIBK) of 3:1. The Ag tokens were formed by e-beam evaporation of 30 nm of Ag followed by a lift-off process (2 hours soak in acetone and 10 seconds sonication). For adhesion purposes, a thin layer (3 nm) of Cr was buried below each metal layer. The EBL was followed by a bi-layer resist lift-off technique due to the well-known advantages compared to single layer lift-off (see reference 31 cited below). The fabricated metasurface pattern was imaged using scanning electron microscopy (SEM). As shown in FIG. 3A the fabricated nano tokens are well defined and match well with the simulated model. The diffraction efficiency is then measured on a custom-built setup.

In the second stage, the RPD aperture pattern is etched through the Ag backplate, the $SiO_2$ substrate and the Ag tokens (but not through the quartz substrate) using optical lithography to generate the RPD aperture pattern over the diffractive grating. Finally, the diffraction efficiency of the final device is measured a second time.

Figure 3B:
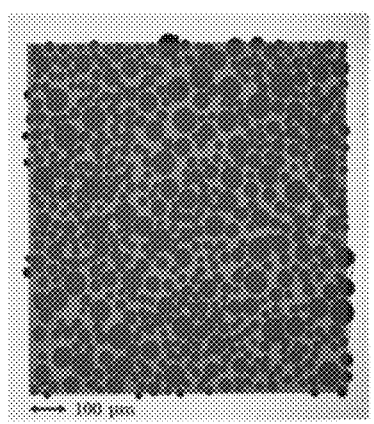
FIG. 3B illustrates an optical microscope image of the front of the fabricated metasurface device. The darker shaded square corresponds to the area patterned by the nano-tokens (shown in FIG. 3A) as seen through the optical microscope. The circles are the etched apertures that enable the see-though regime. The scale is 100 µm.
Figure 3C:
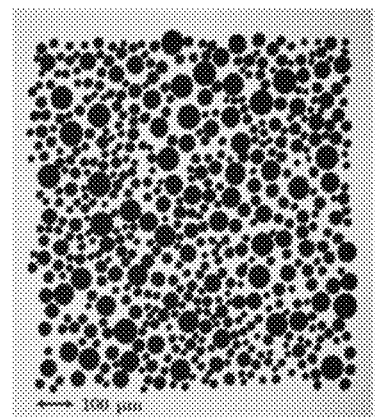
FIG. 3C illustrates an optical microscope of the back of the metasurface device. Only the RPD aperture array is seen. The image is reversed to the same orientation as in FIG. 3B for easy comparison. The scale is 100 µm. The images have been converted to a black and white scale for better visualization.

The final device front and back side imaged through an optical microscope are shown in FIGS. 3B and 3C, respectively. The darker shaded square in FIG. 3B corresponds to the area where the grating structure was written on the front of the device. Due to the large scale of the image compared to the size of a single grating unit cell, the individual Ag tokens are not resolvable with the optical microscope. A second device with a larger footprint (10 mm by 10 mm) was also fabricated with a similar RPD aperture pattern using the same fabrication method. The larger device is to be used to better understand the diffraction artifacts that get formed when light illuminates the back of the device where there are no nano-tokens (as further discussed in the next section).

Testing

Figure 5A:
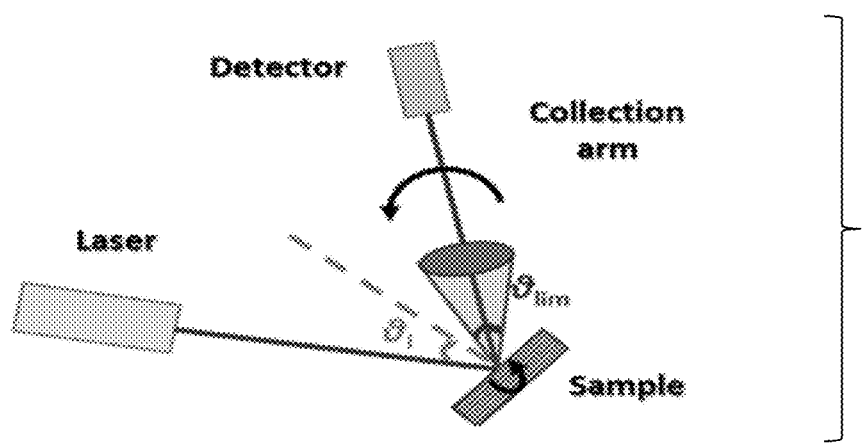
FIG. 5A illustrates the experimental setup used to measure the diffraction efficiency; $\theta_{lim}$ is the angular region where the input and output arm collide and $\theta i$ is the angle of incidence measured from the normal of the surface.

The efficiency of the fabricated grating device was measured in the setup shown in FIG. 5A. A Fianium WhiteLase micro supercontinuum laser was used combined with a 650 nm, 10 nm full-width-half-maximum (FWHM) bandpass filter as a light source. A linear polarizer was used to filter the desired TE polarization for which the grating was optimized. The sample was mounted on a custom-built stage. The stage provides all degrees of freedom required to align the sample and perform measurements for various angles of incidence. For this work the efficiency was measured for AOIs from 0 to 50 degrees. A collection arm was mounted on a rotation stage with the same center of rotation as the center of rotation of the sample that allowed capturing the light from various diffractive orders. Measurements in a region $\theta_{lim}$ around the Littrow angle were not possible as the collection arm occluded the input beam in that regime. A lens was used to collect the light from a desired order and to focus it on a Si photodiode connected to a pico-ammeter.

Given the Gaussian profile of the illumination beam provided by the laser, we overfilled the sample to better match the plane wave illumination used in the simulations. The total input power was measured before the sample using a second Si photodiode connected to the pico-ammeter. A knife edge experiment was used to measure the Gaussian beam profile which was then used to calculate the amount of light hitting the sample for each angle of incidence. The first diffractive order efficiency of the fabricated grating was first measured, and the final device efficiency was then measured again with a similar process once the RPD aperture pattern was added.

Figure 4G:
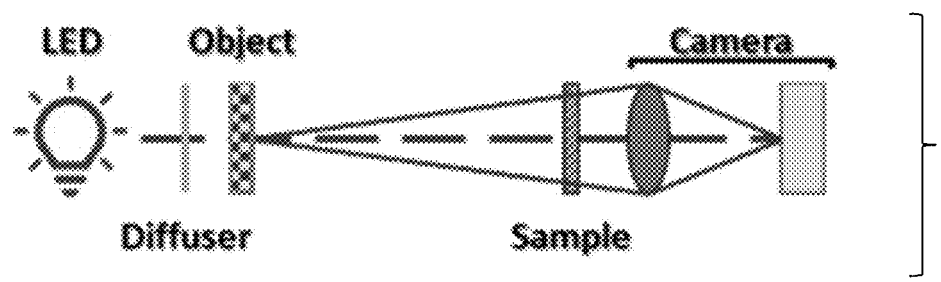
FIG. 4G illustrates the imaging setup used to take the images of the test target in FIGS. 4A-4F.

The larger (10 mm by 10 mm) sample was used to image the diffraction patterns formed when light passed through an RPD aperture array similar to diffraction effects formed when the main device was illuminated from the back. A white light LED with low coherence was used to illuminate the sample. FIG. 4G shows the imaging setup used to take images of a negative 1951 USAF test target illuminated by the LED through a white diffusing paper. This setup represents well a scenario where a user (whose eye is modeled by the camera) looks at an object through an HWD with the RPD aperture array positioned on the combiner of the HWD. The see-through capabilities of the RPD aperture array can be properly evaluated in this configuration.

We also observed that the diffraction patterns formed by the RPD aperture arrays are most prominent when the sample is illuminated by a bright low coherence source like a flashlight or a ceiling lamp. If such devices are used in HWD combiners, the formed diffraction patterns as seen by the human eye could result in dangerous distractions. Examples of some real-life cases where that could be a problem are the user looking at streetlights or the lights from incoming cars. The setup in FIG. 5C was chosen to simulate these conditions with the camera representing the human eye, the sample representing the HWD combiner and the low coherence LED representing the bright illumination. Bandpass filters at 620 nm, 532 nm and 450 nm (10 nm FWHM for all three) were additionally used to simulate illumination at different visible wavelengths. The images were acquired using an Olympus PEN EPL-6 camera. It should be noted that the camera settings and the LED's brightness were chosen such that in FIGS. 4A-4G and 6A-6C the camera employed has no saturated pixels while in FIGS. 5A-5D the camera sensor was saturated to model the human eye's retina saturating when looking at a bright source.

Results and Discussion

Figure 5B:
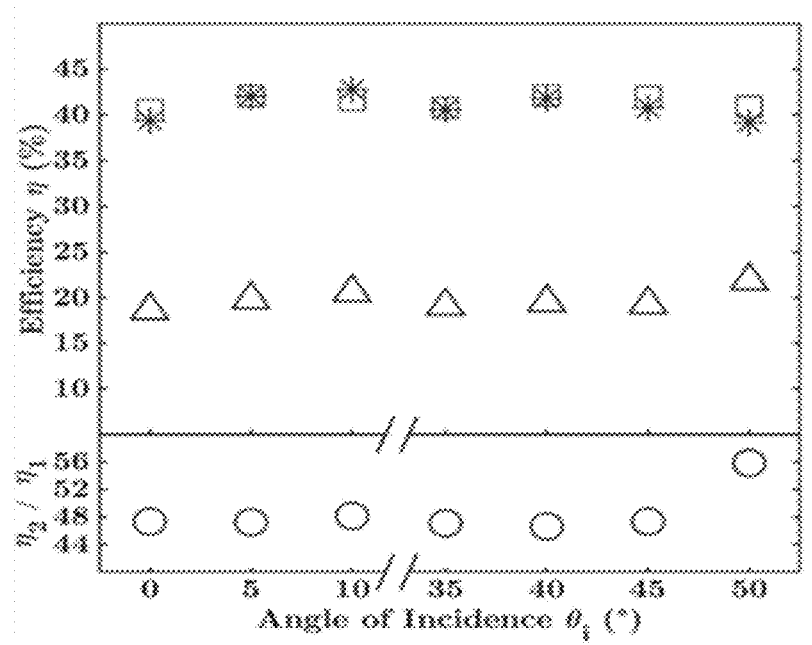
FIG. 5B illustrates the experimental measurements of the device's efficiency before etching the apertures $\eta 1$ (stars) and after etching the apertures $\eta 2$ (triangles). The squares are the simulated values for the efficiency $\eta 1$. The circles show the ratio $\eta 2/\eta 1$ in percent. An x-axis break was used to emphasize the regions of interest where measurements were performed (the region left out corresponds to the regime where the input and output arm collide in the experimental setup). The uncertainty of the measurements is smaller than the size of the markers.
Figure 5C:
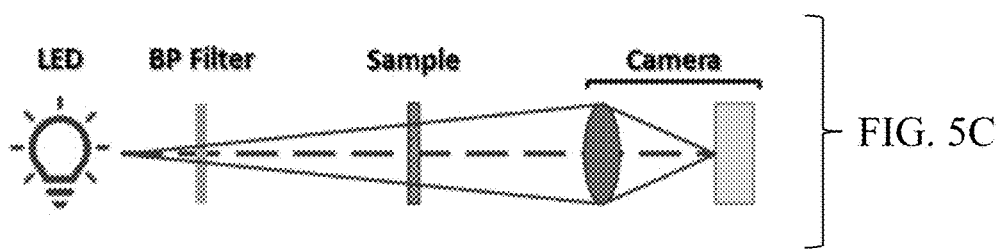
FIG. 5C illustrates the experimental setup used to image the diffraction patterns formed by a 10 mm by 10 mm sample.
Figure 5D:
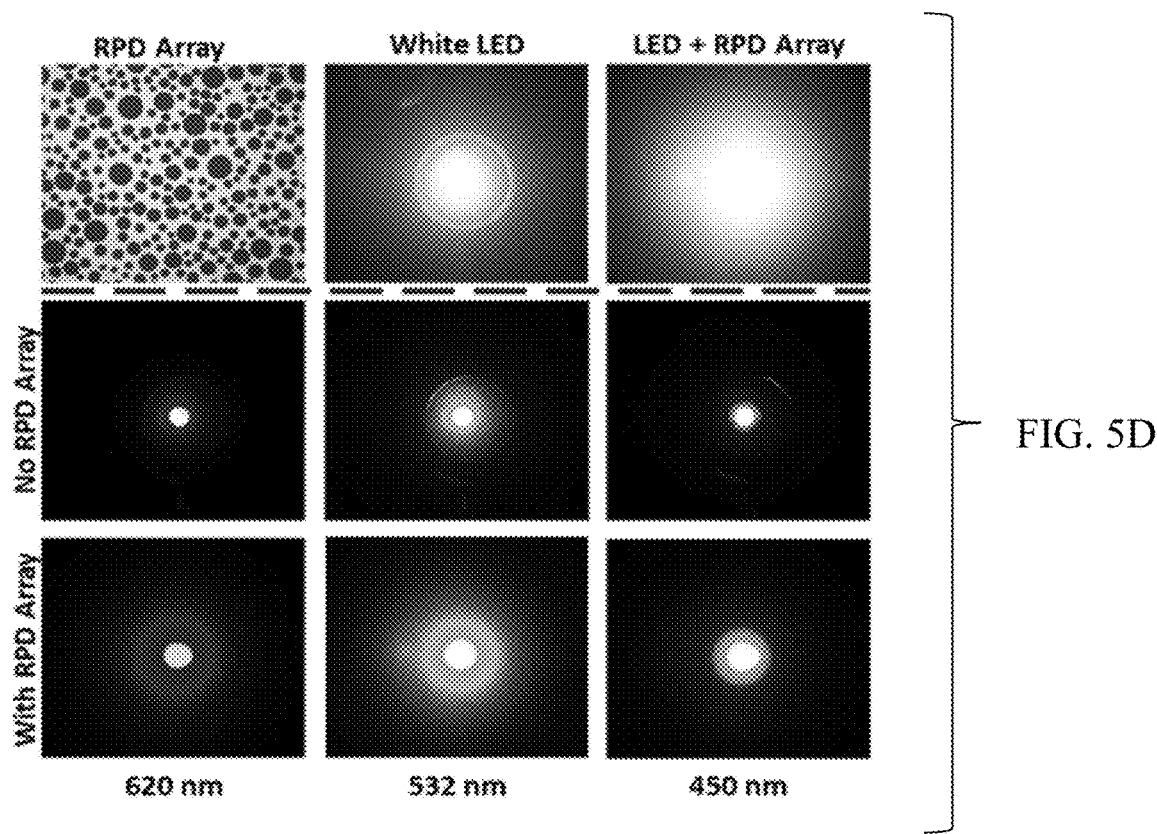
FIG. 5D illustrates gray scale images of the diffraction patterns formed by an RPD aperture array (top left corner) on a 10 mm by 10 mm sample. The pixels in the center of the images are saturated on the camera's detector.

FIGS. 4A-4G demonstrates the see-through functionality of the RPD aperture array using the 10 mm by 10 mm sample (an optical microscope image of the used sample is shown in the top left corner of FIG. 5D). As it can be seen from the line cut intensity plots shown in FIGS. 4C-4F on average the intensity of the image when seen through the RPD aperture array is about 40-50% lower than the intensity of the image seen without the sample. This matches well with the 50% target transmission ratio for the fabricated RPD aperture array. In FIG. 4C, additional contrast loss in the image with the RPD pattern is observed (LED+RPD curve) due to the black regions between the neighboring groups of three white stripes having higher intensity than 0 (while the LED curve reaches close to 0 in those regions). This is due to the diffraction effects from the aperture array. On average that "leaked" light intensity is about 10-15% from the peak intensity of the image without the RPD pattern and is observed also in FIGS. 4D and 4E.

As we move from FIG. 4C to FIG. 4F the line cuts A-D, whose intensity is plotted, represent regions of the test target with higher spatial resolution, increasing from 1.12 line pairs/mm at the top of line cut A to 14.25 line pairs/mm at the bottom of line cut D. Naturally, due to the limited performance of the used camera, the contrast (ratio between the peaks and lows of the intensity curves) decreases for the higher spatial frequencies and the peaks corresponding to each white stripe become less distinguishable. However, most of the peaks that are distinguishable in the image without the RPD pattern are also distinguishable in the image with the RPD pattern. Thus, despite of the lower overall contrast due to the 50% see-through ratio and the additional diffraction artifacts the RPD pattern still provides comparable see-through experience. It should be noted that in FIG. 4F the spatial resolution of the white strips is high enough that it is impossible to resolve two neighboring strips for both the image with and without the RPD aperture array, showing that the loss in resolution is mostly due to the performance of the camera and not the RPD sample. The black regions between neighboring groups of three stripes have the same intensity for both the LED+RPD and the LED curves which confirms that the blur caused by the camera performance is the limiting factor in this region of low resolution and not the diffraction effects from the RPD aperture array.

FIG. 5B presents the efficiency results for the fabricated grating device in reflection. First, it can be seen that the experimentally measured first order efficiency $\eta_1$ (stars) of the diffractive grating was in good agreement with the simulated values (squares). The efficiency $\eta_2$ of the final device including the diffraction grating and the RPD aperture pattern is also shown (triangles) as well as the ratio $\eta_2/\eta_1$ (bottom inset circles).

The see-through ratio for the fabricated device was chosen to be 50%. As previously discussed, this setting means that 50% of the light illuminating the back of the device will be transmitted through. It also means that 50% of the light hitting the front of the sample will not interact with the nano-tokens forming the grating (as they were etched away at the location of the RPD apertures) and hence will not contribute to the diffracted light. The result is an efficiency $\eta_2$ that theoretically should be half of the initial efficiency $\eta_1$ of the grating before the RPD aperture array was etched. It should be noted that the source used in the experiments was not an ideal plane wave but a Gaussian that could cause deviations from the desired transmission ratio (and the corresponding $\eta_2/\eta_1$ ratio). However, as previously stated the incoming beam overfills the sample. Furthermore, the diameters of the RPD apertures (<30 µm) are significantly smaller than the $1/e^2$ beam diameter of the Gaussian beam (~2.2 mm) and hence, the beam intensity over each RPD aperture is relatively constant. We further verified this assumption by numerically calculating the light transmitted by each individual aperture and showed that for the used Gaussian beam the expected $\eta_2/\eta_1$ ratio varies by less than 0.25% from the desired 50% target for all AOIs of interest. The average (averaged over all AOIs from 0 to 50 degrees) experimentally measured ratio $\eta_2/\eta_1$ is 51.33% with a standard deviation of 5.28 as seen in the inset of FIG. 5B.

To study the effects of the RPD pattern under bright light low coherence elimination we also used the larger 10 mm by 10 mm sample. The images in FIG. 5D (besides the optical microscope image of the sample in the top left inset) were taken with the setup shown in FIG. 5C and described in detail in the previous section. All images were taken with the camera sensor saturated at the center of the image to properly simulate the similar saturation effect, looking at a bright light would have on a user's retina. An image of the white LED source without a bandpass filter and without the RPD aperture array pattern is shown in top row, middle inset. The image of the diffracted white light through the RPD aperture array with no bandpass filter is shown in the top right corner. The middle row shows images of the LED source without the RPD aperture array through bandpass filters of 620 nm, 532 nm and 450 nm, from left to right correspondingly. The bottom row shows the light diffracted through the RPD aperture array for each of the corresponding wavelengths. As can be seen by the bottom row and the top, right figure, the diffracted light forms a halo around the original source but no sharp features or structures like streaks, speckle or rings are observed. The only exception is a single dark ring for the blue (450 nm) light which is however not present for the other wavelengths or for the white diffracted light. This behavior is a significant improvement to alternative methods where the apertures are not distributed randomly or have the same diameter.

Figures 6A, 6B, 6C:
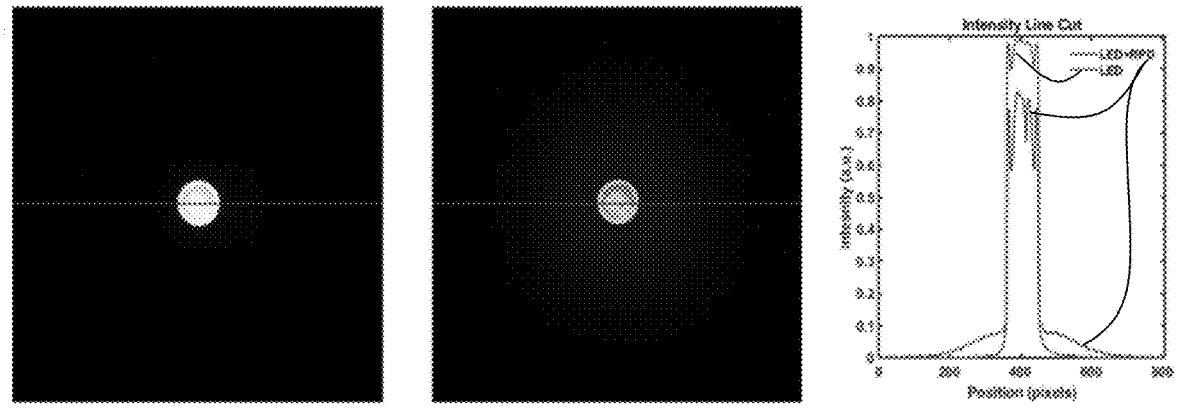
FIG. 6A illustrates the intensity of an image of the LED taken in the setup shown in FIG. 5C without the RPD pattern sample.
FIG. 6B illustrates the intensity of an image of the LED taken in the setup shown in FIG. 5C as seen through the RPD pattern sample.
FIG. 6C illustrates the intensity through the line cuts shown in FIGS. 6A and 6B. The intensity is measured in the same arbitrary units used in FIGS. 4C-4F.

To better quantify the magnitude of the diffraction halo we took two more images of the white LED with and without the RPD aperture array without the camera saturating as shown in FIGS. 6A and 6B. The intensity through the line cuts shown in FIGS. 6A and 6B is shown in FIG. 6C. An overall decrease in intensity is observed as expected due to the semi-transparent properties of the RPD pattern. The diffraction halo caused by the aperture array is evident by the wings of the LED+RPD curve surrounding the area of high intensity at the center of the LED. The peak of those wings is about 10% of the peak intensity without the RPD pattern which is comparable to the diffraction effects seen in FIGS. 4A-4F.

An alternative approach to an ultrathin 2-6 nm Ag backplate to achieve semi-transparency while preserving the anomalous reflection has been described. The approach consists in etching a set of circular apertures with diameters much larger than the wavelength of operation. With this approach, we have demonstrated the design, fabrication and performance of a dual function metasurface based device that can be used in reflection as a grating while also transmitting light when illuminated from the back without introducing undesirable diffraction artifacts. The metasurface grating in one particular embodiment has 1200 lp/mm grating spacing and is optimized to have a ~20% efficiency in the first diffractive order at 650 nm illumination. An RPD aperture array was used to provide the desired transmission ratio of 50%. The light diffracted through this array does not form any sharp features or structures like streaks and rings making it viable for use as part of a visual system. The see-through performance of the RPD pattern was demonstrated. At high resolution imaging, diffraction blur was observed with intensity of 10-15% of the peak intensity without the aperture array. At low resolution imaging, the blur from the imaging optics was predominant and was not noticeably increased by diffraction effects from the see-through RPD pattern. The dual functionality of this see-through metasurface diffraction grating can be useful in a variety of consumer optical systems including waveguide or combiner based HWDs.

The described see-through reflective metasurface diffraction grating elements can be useful in a variety of consumer optical systems including, e.g., see-through waveguide or combiner based HWDs. Such optical systems typically have an image generating component that will be viewed through the optical system, providing a magnified version of the image. This virtual image will appear to be located directly in front of the user, e.g., as viewed through a see-through optical combiner. The user will also be able to see the real world such that the virtual image will augment the real world.

Figure 7A:
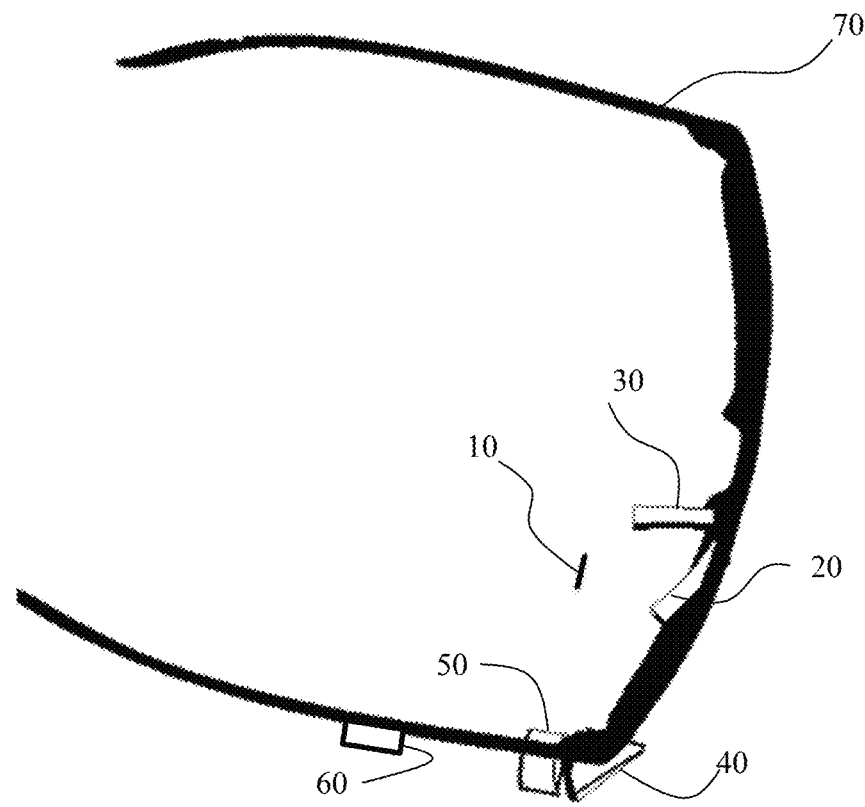
FIGS. 7A and 7B illustrate top and perspective views, respectively, of near eye display optical components attached to an eyeglasses frame.
Figure 7B:
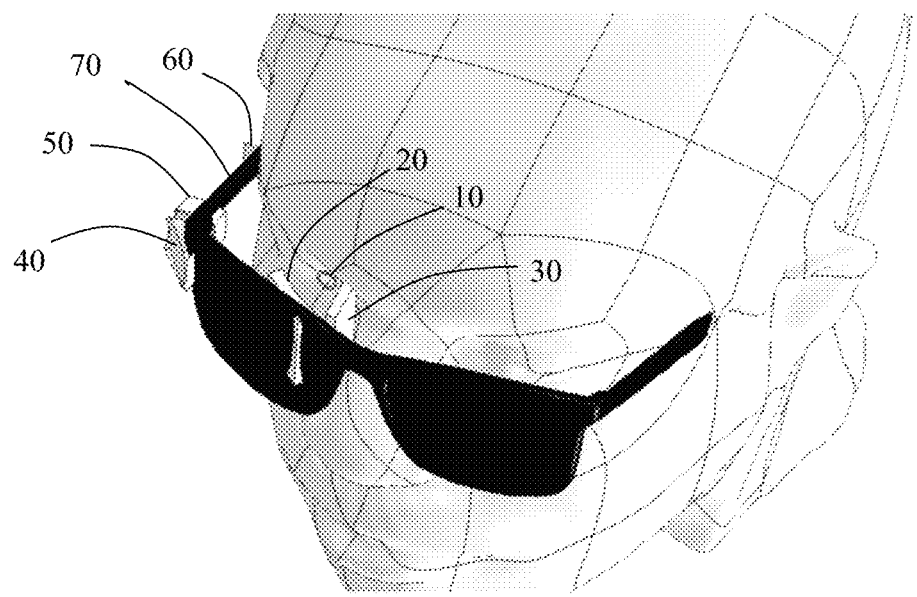

In such optical systems, the see-through combiner is typically used as a first reflective surface together with one or more additional/secondary mirror, lens or prism, and an image source. As shown in FIGS. 7A, 7B, e.g., an image source 60 may be provided operably connected to a frame 70 and optically coupled to a secondary mirror 30 along an optical path, and an optical fold element 40, 40a is positioned between the image source and the secondary mirror in the optical path. As shown in FIGS. 7A, 7B, the optical fold element 40 is positionable proximate the temple adjacent to the eye of a user of the display assembly. In the illustrated head mounted display system, image information originates outside the field of view of the viewer, such as along the temples of eyeglass frames 70. Electronic video display data is converted into the image information by an image source or generator 60, such as an optical pattern generator, including but not limited to spatial light modulators, combined with focusing optics that angularly transform the spatial patterns or by scanning optics that directly generate angular transforms of spatial patterns. The image source encompasses any device for creating or transmitting a light pattern to the combiner. The image source includes image generators such as, but not limited to laser scanning source generators based on Light Emitting Diodes (LEDs) and Vertical Cavity Surface-Emitting Lasers (VCSELs), microdisplays, including but not limited to liquid crystal displays, either reflective or transmissive displays, micro-LEDs, and Organic Light-Emitting Diode (OLEDs), an LCoS (Liquid Crystal on Silicon) display or DLP (Digital Light Processing) device. The image source may also be combined with one or more spherical, aspherical, anamorphic or freeform optical element or lens within the scanning optical path or located close or against the microdisplay to control optical aberrations.

In certain aspects, a separate microdisplay may be utilized for each color of light displayed, while in other aspects a single microdisplay may be utilized (e.g. by displaying a color field sequential image). Likewise, while FIGS. 7A, 7B illustrate a single image source, in some aspects, separate image sources may be utilized for the left and right eye of a viewer. This may facilitate the display of stereoscopic images. In such aspects, separate combiners may be used to produce separate left-eye and right-eye images.

Light emitted from image source 60 may be captured by a first relay lens 50. The relay lens 50 can consist of multiple elements, possibly including a doublet or a diffractive optical element for chromatic aberration management. The surface shapes of the lenses can be spherical, rotationally symmetric asphere, off-axis conic, off-axis asphere, toroidal asphere, or freeform, depending on the type and level of aberration correction needed from these lenses.

The light is then incident on an optical fold element 40, 40a, which may comprise one of the following depending on the embodiment—a fold prism 40 or one or more fold mirrors 40a. The fold prism 40 has a refractive surface that transmits the light exiting the first relay lens. The light within the prism interacts and reflects off the internal surface. The internal surface is at an angle so that the light is redirected. Next, the light encounters a second refractive surface of the prism through which it is transmitted. All three surfaces (2 refractive, 1 reflective surfaces) of the fold prism can be made spherical, rotationally symmetric aspherical, off-axis conic, off-axis asphere, toroidal asphere, or freeform for aberration correction.

If the optical fold element is instead a folding mirror 40a, then the light exiting the first relay lens 50 is incident on the fold mirror 40a, which is tilted to redirect the light roughly along an orthogonal direction. This surface can be made spherical, rotationally symmetric aspherical, or freeform for aberration correction. In this embodiment, after the fold mirror 40a, a second relay lens 35 may be employed whose main purpose is to control the physical size of the fold mirror 40a. The relay lens 35 may consist of multiple elements and have a surface shape that is spherical, rotationally symmetric asphere, off-axis conic, off-axis asphere, toroidal asphere, or freeform.

After the fold prism 40 or second relay lens 35, the light may be focused to an intermediate image that is near the user's nose. Alternatively, an intermediate image may be formed at a reflective fold mirror surface. Following that intermediate image, is a secondary mirror 30 that is angled to reflect the light towards a combiner 20 surface located, e.g., at the typical location of glasses lens. The secondary mirror shape may be spherical, rotationally symmetric asphere, off-axis conic, off-axis asphere, toroidal asphere, or freeform for aberration correction purposes.

Finally, the last component before the light enters the eye is the combiner 20. The shape of this surface can be spherical, toroidal, aspherical, off-axis conic, off-axis asphere, toroidal asphere, or freeform. In accordance with the present disclosure, e.g., combiner 20 may be provided with a see-through reflective metasurface diffraction grating surface to assist in directing the display image beams to the user's eye. After interacting with the combiner, the light is collimated and enters the eye at eyebox 10, which can then focus the incoming beams to form a virtual image.

As illustrated in FIGS. 7A, 7B, the combiner 20 can be operably connected to a frame 70, such as eyeglasses that can be worn on the head of a viewer, as a first reflective surface positionable in front of an eye of a user of the display assembly. The frame 70 may have left and right temples that rest over the ears and a nose piece that rests over the nose. The frame is shaped and sized to position each optical combiner in front of a corresponding eye of the viewer. It is understood, other frames having other shapes may be used (e.g., a visor with ear arms and a nose bridge support, a single contiguous headset member, a headband, goggle type eyewear, etc.). The term eyeglass includes corrective lenses, sunglasses, protective lenses, frames with or without lenses or with or without corrective lenses, as well as any other head mount for operably locating and maintaining the near eye display within the field of view of the viewer. Thus, the eyeglasses frame 70 can locate the secondary mirror 30 proximal to the combiner 20 or spaced apart from the combiner. The secondary mirror 30 may be located proximal to the nose of the viewer to minimize obstruction of peripheral images caused by the secondary mirror.

The combiner 20 can be operably connected to the frames in place of or in addition to eyeglass lenses, and convey the image information from outside the field of view of the viewer into the field of view of the viewer in a form that minimizes the thicknesses of the near-eye displays in front of the eyes of the viewer. The combiner occupies a limited volume of space corresponding to the space within which eyeglass lenses are normally held within the eyeglass frames. That is, the combiner may be a surface off which light bounces that can be limited in thickness (i.e., depth) to more closely resemble the dimensions of conventional eyewear.

In one aspect, the combiner 20, the secondary mirror 30, optical fold element 40, 40a and the image source 60 define a folded geometry of a connecting optical path, wherein the combiner and the secondary mirror are in an off-axis folded geometry which directs images from the optical fold element to an eyebox 10 of the near eye display assembly. At least one of the combiner and the secondary mirror may include a freeform surface, wherein the freeform component corrects optical aberrations induced by a tilting and decentering of the first reflective surface and the second reflective surface.

The near eye display can include two reflective surfaces, the combiner 20 and the secondary mirror 30 wherein the combiner and the secondary mirror are in an off axis folded geometry.

It is understood the near eye display can include additional optics, such as but not limited to a relay lens in the optical path of the source generator. The lens or additional optics may be all-spherical, aspheric, anamorphic, anamorphic aspheric, off-axis conics, off-axis aspheres, or freeform, or combination of all-spherical, aspheric, anamorphic, anamorphic aspheric or freeform.

Generally, a freeform surface is used to correct optical aberrations induced by tilting and decentering of the reflective surfaces in a folded geometry. As used herein, a nonsymmetric surface with bi-axial symmetry is referred to as an anamorphic surface, while a freeform optical surface is any rotationally nonsymmetric surface whose asymmetry goes beyond bi-axial or rotational symmetry or toroidal shape. A freeform surface may be parameterized by normalized basis functions such as the phi-polynomials (e.g. Zernike sets, Q-polynomials, other sets of orthogonal polynomials, XY polynomials, Radial Basis Functions, Splines, or Non-Uniform Rational Basis Spline (NURBS).

Use of a see-through reflective metasurface diffractive grating that imparts arbitrary phase, but includes at least a linear phase for the light redirection, for the reflective combiner surface enables, e.g., redirecting the light that is incident upon it such that the light enters the eye without obstruction and a more aesthetic tilt that conforms with a range of glasses frames.

In summary, metal-dielectric reflective metasurfaces with an engineered phase response provide a versatile alternative to conventional optics, especially when wanting to defy the basic law of reflection as in compact near-eye display systems for augmented reality applications. Specifically, a key component of these display systems is a reflective grating with see-through function or capability. For a reflective metasurface, the transmission regime is typically not allowed due to a non-transparent metal backplate. A method is described to enable see-through metal-dielectric metasurfaces by etching apertures of random position and diameter (RPD) much larger than the design wavelength of the metasurfaces. A 1200 lp/mm metal-dielectric metasurface diffraction grating is specifically demonstrated for use in reflection with 650 nm illumination. The fabricated device shows ~20% diffraction efficiency in the first diffractive order over 0-50° angle of incidence, which is in agreement with the electromagnetic simulations. The device is semi-transparent, letting ~50% of the light illuminating the back of the device through via the RPD apertures. Furthermore, the light transmitted through the RPD apertures does not show any defined features due to diffraction (rings, fringes, etc.) aside from a quasi-uniform halo.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

REFERENCES cited above, the disclosures of which are herein incorporated by reference:

1. O. Cakmakci, J. P. Rolland, "Examples of HWD Architectures: Low-, mid- and wide-field of flew designs," in *Handbook of Visual Display Technology*, J. Chen, W. Cranton, M. Fihn, eds. (Springer, 2012).
2. B. Kress and T. Starner, "A review of head-mounted displays (HMD) technologies and applications for consumer electronics," in *Proc. SPIE* 8720, *Photonic Applications for Aerospace, Commercial, and Harsh Environments IV*, (2013).
3. M. J. Hayford, O. Cakmakci, "Optical components for head-worn displays," in *Handbook of Visual Display Technology*, J. Chen, W. Cranton, M. Fihn, eds. (Springer, 2016).
4. Z. Liu, Y. Pang, C. Pan, and Z. Huang, "Design of a uniform-illumination binocular waveguide display with diffraction gratings and freeform optics," Opt. Express 25, 30720-30732 (2017).
5. A. Travis, "Wide field-of-view virtual image projector," U.S. patent application 20,130,021,392 A1 (Jan. 24, 2013).
6. A. Travis, "Wide field-of-view virtual image projector," U.S. patent application 20,130,329,301 A1 (Dec. 12, 2013).
7. T. Levola, "Diffractive optics for virtual reality display," J. Soc. Inf. Dis. 14(5), 467-475 (2006).
8. H. Mukawa, K. Akutsu, I. Matsumura, S. Nakano, T. Yoshida, M. Kuwahara, and K. Aiki, "A full-color eyewear display using planar waveguides with reflection volume holograms," J. Soc. Inf. Disp. 17(3), 185-193 (2009).
9. H. Mukawa, K. Akutsu, I. Matsumura, S. Nakano, T. Yoshida, M. Kuwahara, K. Aiki, and M. Ogawa, "A full color eyewear display using holographic planar waveguides," SID International Symposium Digest of Technical Papers 39(1), 89-92 (2008).
10. A. Bauer and J. P. Rolland, "Visual space assessment of two all-reflective, freeform, optical see-through headworn displays," Opt. Express 22(11), 13155-13163 (2014).
11. J. P. Rolland, A. N. Vamivakas, A. Bauer, D. K. Nikolov, F. Cheng, "Augmented reality display," U.S. Provisional Pat. Ser. No. 62/679,505, filed Jun. 1, 2018.
12. X. Chen, L. Huang, H. Mühlenbernd, G. Li, B. Bai, Q. Tan, G. Jin, C.-W. Qiu, S. Zhang, and T. Zentgraf, "Dual-polarity plasmonic metalens for visible light," Nat. Commun. 3, 1198 (2012).
13. A. Pors and S. I. Bozhevolnyi, "Efficient and broadband quarter-wave plates by gap-plasmon resonators," Opt. Express 21, 2942-2952 (2013).
14. A. Pors, M. G. Nielsen, and S. I. Bozhevolnyi, "Broadband plasmonic half-wave plates in reflection," Opt. Lett. 38, 513-515 (2013).
15. F. Cheng, L. Ding, L. Qiu, D. Nikolov, A. Bauer, J. P. Rolland, and A. N. Vamivakas, "Polarization-switchable holograms based on efficient, broadband multifunctional metasurfaces in the visible regime," Opt. Express 26, 30678-30688 (2018).
16. S. Sun, K. Y. Yang, C. M. Wang, T. K. Juan, W. T. Chen, C. Y. Liao, Q. He, S. Xiao, W.-T. Kung, G.-Y. Guo, L. Zhou, and D. P. Tsai, "High-efficiency broadband anomalous reflection by gradient meta-surfaces," Nano Lett. 12, 6223-6229 (2012).
17. A. Pors, and S. I. Bozhevolnyi, "Plasmonic metasurfaces for efficient phase control in reflection," Opt. Express 21, 27438-27451 (2013).
18. Z. Li, E. Palacios, S. Butun, and K. Aydin, "Visible-frequency metasurfaces for broadband anomalous reflection and high-efficiency spectrum splitting," Nano Lett. 15, 1615-1621 (2015).
19. A. L. Kitt, J. P. Rolland, and A. N. Vamivakas, "Visible metasurfaces and ruled diffraction gratings: a comparison,", Opt. Mat. Express 5, 2895-2901 (2015).
20. T. Coan, G. S. Barroso, R. A. F. Machado, F. S. de Souza, A. Spinelli and G. Motz, "A novel organic-inorganic PMMA/polysilazane hybrid polymer for corrosion protection," Prog. Org. Coat. 89, 220-230 (2015).
21. T. Coan, G. S. Barroso, G. Motz, A. Bolzán and R. A. F. Machado, "Preparation of PMMA/hBN composite coatings for metal surface protection," Mat. Res. 16(6), 1366-1372 (2013).
22. F. Cheng, J. Gao, Ting S. Luk & X. D. Yang, "Structural color printing based on plasmonic metasurfaces of perfect light absorption," Scientific Reports 5, 11045 (2015).
23. F. Cheng, X. D. Yang, D. Rosenmann, L. Stan, D. Czaplewski, and J. Gao, "Enhanced structural color generation in aluminum metamaterials coated with a thin polymer layer," Opt. Express 23, 25329-25339 (2015).
24. D. K. Nikolov, F. Cheng, N. Basaran, A. Bauer, J. P. Rolland, and A. N. Vamivakas, "Long-term efficiency preservation for gradient phase metasurface diffraction gratings in the visible," Opt. Mater. Express 8, 2125-2130 (2018).
25. A. Axelevitch, B. Gorenstein, and G. Golan, "Investigation of Optical Transmission in Thin Metal Films," Phys. Procedia. 32, 1-13 (2012).
26. S. Link, C. Burda, Z. L. Wang, and M. A. El-Sayed, "Electron dynamics in gold and gold-silver alloy nanoparticles: the influence of a nonequilibrium electron distribution and the size dependence of the electron-phonon relaxation," J. Chem. Phys. 111, 1255-1264 (1999).
27. M. Fox, "Molecular Materials," in *Optical Properties of Solids* (Oxford University Press, 2010).
28. P. D. Lee, C. T. LaBree, and R. A. Freibrun, "Fresnel diffraction patterns of an array of circular apertures," J. Opt. Soc. Am. 57, 1115-1120 (1967).
29. R. Bergsten and S. Huberty, "White-light Fresnel diffraction by a circular aperture," J. Opt. Soc. Am. 67, 643-647 (1977).
30. D. S. Burch, "Fresnel diffraction by a circular aperture," American Journal of Physics 53, 255 (1985).
31. T. Deyu, L. Ming, S. Liwei, X. Changqing, Z. Xiaoli, "A ZEP520-LOR bilayer resist lift-off process by e-beam lithography for nanometer pattern transfer," in *7th IEEE Conference on Nanotechnology* (2007).
32. Pors, A.; Albrektsen, O.; Radko, I. P.; Bozhevolnyi, S. I. *Sci. Rep.* 2013, 3, 2155.

The invention claimed is:

1. A see-through reflective optical device comprising:
    a reflective metasurface configured for a targeted design optical wavelength, wherein the reflective metasurface comprises a sub-wavelength periodic arrangement of meta-atoms formed by patterned isolated gap surface plasmon (GSP) resonators, where the patterned isolated GSP resonators comprise a patterned optically thin metal layer for the design wavelength, an optically thick metal layer for the design wavelength, and an insulator layer between the patterned optically thin metal layer and the optically thick metal layer; and
    an array of apertures of random positions and diameters greater than the targeted design wavelength formed through the reflective metasurface providing a designed percentage of light transparency through the reflective metasurface.

2. The see-through reflective optical device of claim 1, wherein the reflective metasurface comprises a reflective diffraction grating metasurface.

3. The see-through reflective optical device of claim 2, wherein the reflective diffraction grating metasurface is at least partially defined by a periodic arrangement of unit cells, wherein each unit cell having a plurality of meta-atoms.

4. The see-through reflective optical device of claim 3, wherein at least two of the meta-atoms in a unit cell have different length to width ratios.

5. The see-through reflective optical device of claim 1, wherein the patterned optically thin metal layer and the optically thick metal layer comprise silver.

6. The see-through reflective optical device of claim 5, wherein the patterned optically thin metal layer has a thickness of less than 40 nm.

7. The see-through reflective optical device of claim 1, wherein the targeted design optical wavelength is in the range from 400-750 nm.

8. The see-through reflective optical device of claim 1, wherein the patterned insulator layer comprises $SiO_2$.

9. The see-through reflective optical device of claim 7, wherein the array of apertures of random positions and diameters comprises circular apertures each of a random diameter varying between at least two times the target design wavelength and 60 µm positioned at random non-intersecting positions.

10. The see-through reflective optical device of claim 7, wherein the array of apertures of random positions and diameters comprises circular apertures each of a random radius varying between 8 µm and 30 µm positioned at random non-intersecting positions.

11. The see-through reflective optical device of claim 7, wherein a sum of the area of all apertures of the array of apertures of random positions and diameters provides a design transparency percentage of visible light of 10-90% through the metasurface diffraction grating.

12. The see-through reflective optical device of claim 1, wherein the device is a combiner that combines two images from two different sides of the combiner.

13. A near eye display assembly comprising
    (a) frame;
    (b) a combiner operably connected to the frame as a first reflective surface positionable in front of an eye of a user of the display assembly;
    (c) a secondary mirror operably connected to the frame as a second reflective surface positionable proximate a side of the nose adjacent to the eye of a user of the display assembly;
    (d) an image source operably connected to the frame and optically coupled to the secondary mirror along an optical path; and
    (e) an optical fold element between the image source and the secondary mirror in the optical path, and positionable proximate the temple adjacent to the eye of a user of the display assembly;
    wherein the combiner and the secondary are in a folded geometry which directs images from the optical fold element to an eyebox of the near eye display assembly, and wherein the combiner comprises a see-through reflective optical device according to claim 1, which provides wavefront control of a reflected image from the image source which combines the reflected image with an image transmitted through the combiner.

14. The near eye display assembly of claim 13, wherein the reflective metasurface of the see-through reflective optical device comprises a reflective diffraction grating metasurface which is at least partially defined by a periodic arrangement of unit cells, wherein each unit cell having a plurality of meta-atoms, and wherein at least two of the meta-atoms in a unit cell have different length to width ratios.

15. The near eye display assembly of claim 14, wherein the targeted design optical wavelength of the see-through reflective optical device of is in the range from 400-750 nm.

16. The near eye display assembly of claim 15, wherein the array of apertures of random positions and diameters of the see-through reflective optical device comprises circular apertures each of a random diameter varying between at least two times the target design wavelength and 60 µm positioned at random non-intersecting positions.

17. The near eye display assembly of claim 15, wherein the array of apertures of random positions and diameters of the see-through reflective optical device comprises circular apertures each of a random radius varying between 8 µm and 30 µm positioned at random non-intersecting positions.

18. The near eye display assembly of claim 15, wherein a sum of the area of all apertures of the array of apertures of random positions and diameters of the see-through reflective optical device provides a design transparency percentage of visible light of 10-90% through the metasurface diffraction grating.

19. The see-through reflective optical device of claim 1, wherein the array of apertures of random positions and diameters comprises circular apertures each of a random radius varying between 8 µm and 30 µm positioned at random non-intersecting positions.

20. The see-through reflective optical device of claim 1, wherein a sum of the area of all apertures of the array of apertures of random positions and diameters provides a design transparency percentage of visible light of 10-90% through the metasurface diffraction grating.

* * * * *